United States Patent [19]

San Miguel

[11] 4,088,240

[45] May 9, 1978

[54] FUEL TANK LEAKAGE FIBER FLOW SEALANT

[75] Inventor: Anthony San Miguel, Ridgecrest, Calif.

[73] Assignee: The United States of America as represented by the Secretary of the Navy, Washington, D.C.

[21] Appl. No.: 722,995

[22] Filed: Sep. 13, 1976

[51] Int. Cl.² .................. B65D 25/14; B65D 25/34
[52] U.S. Cl. ............................ 220/452; 428/35; 428/85; 428/90; 428/97; 428/912
[58] Field of Search ............ 428/35, 912, 85, 90, 428/97, 63; 220/63 A, 9 A, 9 R; 152/346, 347

[56] References Cited

U.S. PATENT DOCUMENTS

| 1,339,948 | 5/1920 | Dirienzo et al. | 152/346 |
| 1,436,985 | 11/1922 | Friant | 428/912 |
| 2,601,525 | 6/1952 | Howald | 220/63 A |
| 2,859,489 | 11/1958 | Morrison | 220/9 R |
| 2,951,608 | 9/1960 | Morrison | 220/9 R |
| 3,536,576 | 10/1970 | Schwartz | 428/912 |
| 3,801,425 | 4/1974 | Cook | 428/912 |
| 3,823,056 | 7/1974 | Cooney | 428/97 |
| 3,977,847 | 8/1976 | Clark | 55/471 |

Primary Examiner—William R. Dixon, Jr.
Attorney, Agent, or Firm—R. S. Sciascia; Roy Miller; Thomas W. Hennen

[57] ABSTRACT

A self-sealing fuel tank which utilizes elongated nonself-adhering polymer fibers attached to the inner surface of the tank wall and interwoven to form a carpet-like liner for efficiently sealing large tears and cored holes. After penetration of the tank wall by a large or tumbling projectile, escaping fluid causes nearby elongated fibers to be swept into the hole, thereby choking the escaping fluid flow. Conventional small caliber self-sealant incorporated in the tank wall then flows into the hole choked by fibers and completes the seal.

7 Claims, 4 Drawing Figures

FUEL TANK LEAKAGE FIBER FLOW SEALANT

BACKGROUND OF THE INVENTION

1. Field of the Invention

This invention pertains to self-sealing tanks and more particularly to such tanks which retain their self-sealing ability when penetrated by large or tumbling projectiles.

2. Description of the Prior Art

Prior attempts to construct self-sealing tanks usually have employed a tank wall which includes a flowable sealant. This type of tank wall usually includes a sealant which swells when it comes in contact with either air, or the contained fluid, or a separate swelling agent. In these types of self-sealing tanks, a bullet or other projectile penetrating the tank wall will cause the included sealant to flow into the bullet hole until the flow has been choked off and a dry seal obtained. Examples of such structure are taught in U.S. Pat. No. 3,664,904 and U.S. Pat. No. 3,801,425, both to Richard L. Cook. Other tank constructions utilize elastomeric foam or foaming compositions which, when exposed to the contained fluid, foam or swell to close the hole.

Known types of self-sealing containers are most efficient when called upon to seal small diameter holes. As the diameter of the hole caused by the projectile increases, the ability of the tank self-sealing feature to close the hole diminishes. This is especially true when the hole is cored. The flowing sealant begins to close the hole but is swept through the hole by the rapidly escaping fluid, thus making sealing of large holes impossible with most conventional self-sealing tank constructions.

SUMMARY OF THE INVENTION

These problems are overcome by the present invention which utilizes a plurality of elongated non-self-adhering polymer fibers attached to the inner surface of a fluid container. These fibers are interwoven to form a carpet-like liner which will efficiently seal large tears and cored holes.

After a large diameter projectile penetrates the tank wall, the escaping fluid causes a plurality of nearby fibers to be swept into the hole with the escaping fluid. As the fibers enter the hole they reduce the cross-sectional flow area of the hole and consequently reduce the flow rate of escaping fluid. By thus reducing the fluid flow rate through the hole, and by simultaneously providing structure in the form of fibers in the hole, the conventional small caliber sealant may successfully expand into the hole, mix with the fibers, and form a successful seal.

BRIEF DESCRIPTION OF THE DRAWINGS

Further advantages of the present invention will emerge from a description which follows of a possible embodiment of a self-sealing tank according to the invention given with reference to the accompanying drawing figures in which.

DESCRIPTION OF THE PREFERRED EMBODIMENT

Figure 1:
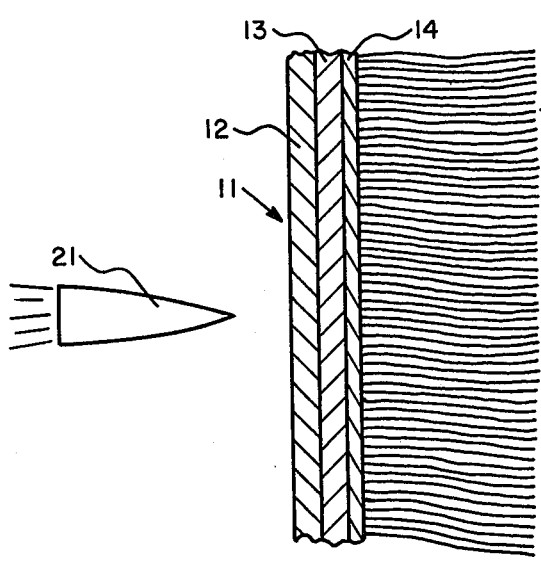
FIG. 1 illustrates a sectional view of a tank wall before impact by a projectile.

Referring now to the drawing figures wherein like reference numerals correspond to like parts and elements throughout the several views there is shown in FIG. 1 tank wall 11 having fluid impervious layer 12, which may be metallic, and small caliber sealant layer 13. Attached to the inner surface of tank wall 11 is liner 14 from which extends elongated fibers 15. Also in FIG. 1 projectile 21 is shown about to impact wall 11.

Figure 2:
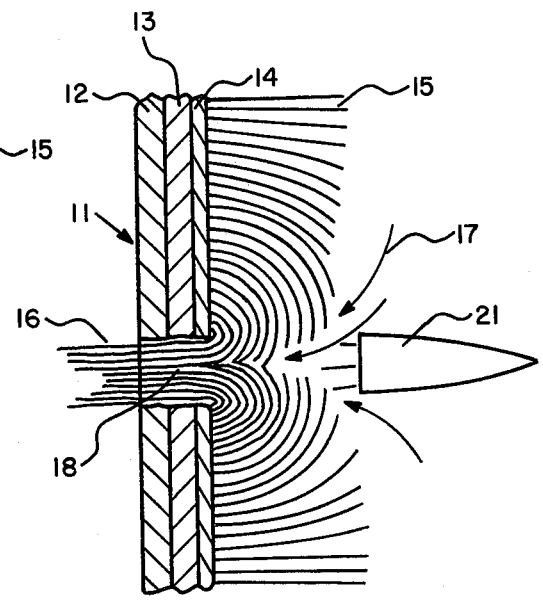
FIG. 2 illustrates a sectional view of a tank wall immediately after projectile penetration.

FIG. 2 illustrates tank wall 11 immediately after projectile 21 has penetrated. As escaping fluid 17 rushes out through the hole made by projectile 21, fibers 15 in the vicinity of hole 18 are swept through the hole by fluid 17 and choke off or greatly reduce the fluid flow area.

Figure 3:
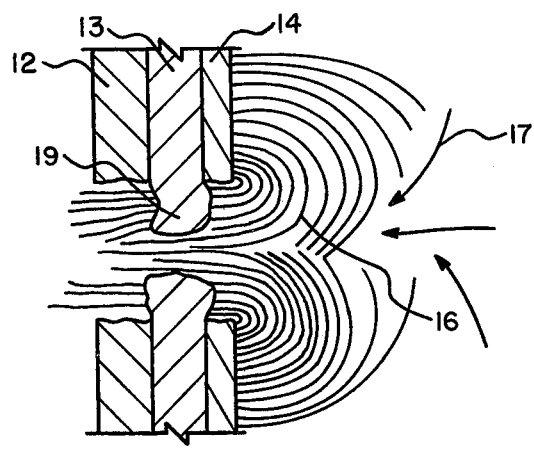
FIG. 3 illustrates a sectional view of a penetrated tank wall undergoing self-sealing.

Immediately after penetration of tank wall 11 by projectile 21, small caliber sealant layer 13 begins to close hole 18. Sealant 13 mixes with swept fibers 16 and gradually bridges hole 18 to stop escaping fluid 17. FIG. 3 shows lip 19 formed by sealant layer 13 as it begins to extend across hole 18. Because the flow rate of escaping fluid 17 has been reduced or choked off by swept fibers 16, sealant 13 is able to seal hole 18 without being swept through and away from the center of hole 18. Swept fibers 16 reduce the cross sectional flow area of hole 18 and also provide structural support for sealant 13 to form lip 19.

Swept fibers 16, by slowing the rate of escaping fluid 17, reduce the amount of fluid lost in a given period of time. By reducing fuel loss, the range of, for example, an aircraft equipped with this invention is extended over that of an equally damaged aircraft which is not equipped with the self-sealing fuel tank of this invention.

Figure 4:
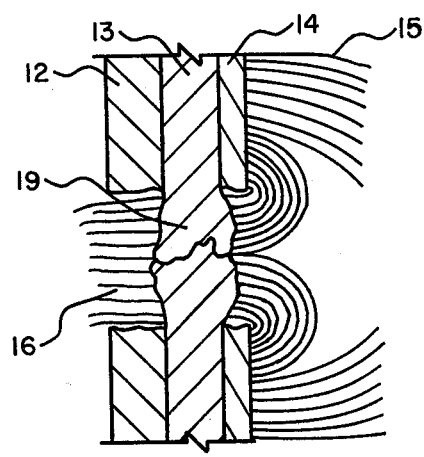
FIG. 4 illustrates a sectional view of a penetrated tank wall after sealing is complete.

FIG. 4 illustrates tank wall 11 and hole 18 after sealant layer 13 has fully closed hole 18 against further escape of the contained fluid.

Elongated fibers 15 may be made of any non-self-adherent material and should be flexible and of sufficient diameter, length, and number to efficiently choke fluid flow through a hole. Elongated fibers 15 may be advantageously made from a room temperature vulcanate material such as a silicone elastomer or other non-self-adhering polymer. Such materials do not swell when exposed to hydrocarbon fuels, and do not significantly deteriorate with age. The tank construction of this invention could be used in the fuel tank of any vehicle or in any fluid containing tank which it is desired to make self-sealing. Of course, the tank construction of this invention is most advantageous when used in conjunction with a military vehicle which is likely to be exposed to projectile penetration.

The invention has been described in an illustrative manner and it is to be understood that the terminology which has been used is intended to be in the nature of words of description rather than of limitation. Obviously, many modifications and variations of the present invention are possible in the light of the above teachings. It is therefore to be understood that within the scope of the appended claims, the invention may be practiced otherwise than as specifically described.

What is claimed is:

1. A self-sealing tank wall comprising:
   a liquid impervious wall which is susceptible to puncture, and which has inner and outer surfaces for defining a liquid enclosure;

sealing means attached to said inner surface of said liquid impervious wall for providing flowable sealant to the vicinity of a puncture in said liquid impervious wall; and a carpet-like liner attached to said sealing means, said liner having an interwoven configuration comprising elongated non-self-adherent fibers, and having said fibers individually extending from said liner, and said extending fibers being responsive to flow of said liqiud through said puncture.

2. A self-sealing tank wall as set forth in claim 1 wherein said elongated non-self-adherent fibers comprise a room temperature vulcanate.

3. A self-sealing tank wall as set forth in claim 2 wherein said elongated non-self-adherent fibers comprise silicone elastomer.

4. A self-sealing tank wall as set forth in claim 1 wherein said sealing means comprises a small caliber sealant layer.

5. A self-sealing tank wall as set forth in claim 1 wherein said flowable sealant is configured to form a barrier to escaping liquid at the site of said puncture.

6. A self-sealing tank wall as set forth in claim 1 wherein said extending responsive fibers are configured to be swept into said puncture by said liquid flow.

7. A self-sealing tank wall as set forth in claim 1 wherein said responsive fibers structurally cooperate with said flowable sealant at said puncture to form a barrier to escaping liquid at said puncture.

* * * * *